United States Patent Office 2,835,646
Patented May 20, 1958

2,835,646

THERMOPLASTIC IMPACT-RESISTANT COMPOSITION OF A STYRENE/ACRYLONITRILE RESIN AND A RUBBERY ETHYL ACRYLATE POLYMER

Harold S. Sell, Cuyahoga Falls, Ohio, assignor to The Goodyear Tire & Rubber Company, Akron, Ohio, a corporation of Ohio No Drawing. Application December 8, 1955
Serial No. 551,733

5 Claims. (Cl. 260—45.5)

This invention relates to thermoplastic molding compositions having the exceptional combination of properties of high impact strength, high hardness, good rigidity and high softening temperature without the need of vulcanization to develop these properties in the composition. The composition of this invention comprises in combination a hard resinous copolymer resulting from the polymerization of a mixture comprising styrene and acrylonitrile and a relatively soft elastic polymer resulting from the polymerization of ethyl acrylate.

The normally hard thermoplastic resinous styrene/acrylonitrile copolymer component of the blend of this invention may be made in accordance with the procedure set forth in U. S. Patents 2,140,048 and 2,439,202 using an aqueous emulsion mixture of the monomers comprising 50 to 85% by weight of styrene and correspondingly from 50–15% by weight of acrylonitrile. The following general formulation shows the range of parts of the various components that may be used in preparing the resinous styrene/acrylonitrile copolymer:

| Components: | Parts by weight |
|---|---|
| Water | 180–400 |
| Peroxidic catalyst | 0.15 |
| Styrene | 85–50 |
| Acrylonitrile | 15–50 |
| Emulsifying agent | 0.5–150 |
| Modifier | 0–1.0 |

The styrene/acrylonitrile resinous copolymer used in the preparation of the blend of this invention was made by forming in a reactor an aqueous emulsion of 180 parts of water, 5 parts of the sodium salt of hydrogenated abietic acid as the emulsifying agent, 0.3 part of potassium persulfate as the catalyst and .03 part of sodium hydroxide which is used to maintain the pH of the solution up to about 9.5 and aid in the completion of the saponification of the emulsifying agent. The air was then evacuated from the reactor and 70 parts of styrene monomer and 30 parts of acrylonitrile monomer were charged into the evacuated reactor. The reaction mass was stirred while being heated to a temperature of from 90° F. to 100° F. until the monomers were 100% converted to the polymer, which took from two to three hours to complete the reaction. The reaction product was then coagulated with aluminum sulfate, washed with water and spray dried to recover the resinous copolymer.

The styrene/acrylonitrile polymer may also be made from a mixture of acrylonitrile and styrene containing from 1 to 10 parts of a third monomer such as ethylene-bis-dichloro acrylate or divinyl benzene. These monomers have the effect of causing the resulting polymer to be insoluble in benzene.

The rubbery acrylate component of the blend may be made in accordance with the procedure set forth in U. S. Patent 2,086,093 using an aqueous emulsion system for causing polymerization of the acrylate monomer. The following general formulation shows the range of parts of the various components that may be used in carrying out the polymerization of the acrylate monomer:

| Components: | Parts by weight |
|---|---|
| Water | 100–400 |
| Acrylate | 100 |
| Emulsifying agent | 1–10 |
| Catalyst | .05–5 |

The specific acrylate rubbery copolymer used in making a blend of this invention was made by forming an aqueous emulsion of 190 parts of water, 3 parts of the emulsifier Naccinol NRSF (an alkyl aryl sulfonate), .03 part of potassium persulfate and .1 part of sodium hydroxide together with 100 parts of ethyl acrylate. To this reaction mixture was added .15 part of sodium thiosulfate in 10 parts of water which acted as an activator of polymerization. The reactive mixture was heated at 86° F. for 6 hours, at the end of which time 36% solids had been formed. The resulting ethyl acrylate polymer was recovered in a conventional manner by coagulation, washing and drying.

The styrene-acrylonitrile resinous copolymer and the rubbery acrylate may be admixed with each other in any suitable manner which will result in the formation of an intimate homogenous blend or mixture. Well-known methods for producing such an intimate mixture include the use of a hot mill heated to a temperature of from 300° to 350° F. on which the resinous and rubbery compositions are blended. The styrene-acrylonitrile resin is first banded on the mill set at a bite or gauge to permit a small rolling band of the resin to be maintained above the bite of the two rolls of the mill. Small portions of the rubbery acrylate are then added to the band of resin allowing each addition of rubbery acrylate to disperse into the resin before the next addition of rubbery acrylate is made.

Another well-known method for physically mixing the two components involves the use of an internal mixer, such as the Banbury mixer. The cheeks and rotor of the Banbury are maintained at a minimum temperature of about 250° F. and then the resinous and rubbery component of the blend is charged into the Banbury and held by the ram of the Banbury under pressure until the two components have been thoroughly dispersed.

The resinous and rubbery components of this invention may also be blended by co-coagulation of the separately prepared latices of the resinous and rubbery components. However after the latices have been co-coagulated optimum properties of the blend are obtained after the co-coagulated blend has been hot processed, as for example on a mill or in a Banbury mixer. This fact is clearly shown in the following table showing that the most desirable Izod impact is developed when the co-coagulated blend of components have been hot milled at a temperature of 330° F. Each of the hot-milled samples were formed into test pieces by pressing a quantity of the hot-milled blend of resin and rubbery components under a pressure of 1000 lbs. per square inch at a temperature of 325° F. In each of the hot-processed co-coagulated blends 70 parts of a resin resulting from the copolymerization of a mixture containing 70 parts of styrene and 30 parts of acrylonitrile was blended with 30 parts of the rubbery acrylate resulting from the polymerization of 95 parts of ethyl acrylate and 5 parts of 2-chloroethyl vinyl ether, which rubbery acrylate is also referred to in the trade as Lactoprene EV, the preparation of which is more specifically set forth in the article appearing in India Rubber World, 116, 355–360 (1947). A rubbery ethyl acrylate polymer resulting from the polymerization of a mixture containing at least 95% by weight of ethyl acrylate and up to 5% by weight of 2-chloroethyl vinyl ether may be prepared in the same manner as is described for the preparation of Lactoprene EV in the India Rubber World article just referred to.

| Milled @ | 150° F. | 200° F. | 240° F. | 250–300° F. | 330° F. |
|---|---|---|---|---|---|
| Shore A | 75 | 74 | 74 | 74 | 75 |
| Izod Impact, ft.#/in. Notch | 0.5 | 1.0 | 1.5 | 3.3 | 10.2 |

Each of the blends appearing in the following tables were made by hot milling the components on a two-roll mill by first forming a blend of the styrene-acrylonitrile resin on the mill at 325° F. and then adding small portions of the particular rubbery acrylate to the resin and allowing the rubbery acrylate to become dispersed with the resin before each additional portion of rubbery acrylate was added. After all of the rubbery acrylate had been added the milling was continued for five minutes to assure thorough dispersion of each component with the other.

The ethyl acrylate polymer made in the manner described above was blended on a two-roll mill at 325° F. with the styrene/acrylonitrile resinous copolymer made as described above by first forming a band of the resin on the roll and then adding the rubbery acrylate in small portions until the components were thoroughly dispersed. Various ratios of the components were used as indicated in the table. The samples were molded into test strips under a pressure of 1000 pounds per square inch and tested for hardness, softening point, notched and unnotched impact resistance, and Olsen stiffness. The results of these tests are set forth in Table I. All parts are by weight unless otherwise indicated.

TABLE I

*Blends of ethyl acrylate polymer with styrene/acrylonitrile resinous copolymer*

| Examples | Control | 1 | 2 | 3 | 4 | 5 |
|---|---|---|---|---|---|---|
| Parts of styrene/acrylonitrile copolymer | 100.0 | 90.0 | 80.0 | 70.0 | 60.0 | 50.0 |
| Parts of ethyl acrylate polymer | 0 | 10.0 | 20.0 | 30.0 | 40.0 | 50.0 |
| Shore D Hardness | 86 | 82 | 80 | 75 | 70 | 62 |
| Softening Point, °F | 110 | 224 | 224 | 223 | 215 | 192 |
| Izod Notched Impact [1] | .17 | .50 | .70 | 1.0 | 11.3 | 15.8 |
| Izod Unnotched Impact [2] | 1.17 | 2.33 | 2.42 | 11.6 | 11.4 | [3] DNB |
| Olsen Stiffness, Pounds required to deflect a 1″ x 4″ x 0.075″ test strip 30° | 1.32 | 1.58 | 1.42 | .76 | .56 | .20 |

[1] Ft.-lbs. per inch of notch.
[2] Ft.-lbs. per inch of width.
[3] Did not break (in excess of 17 ft.-lbs. per inch of width of sample).

Lactoprene EV made in the manner described above was blended with the styrene/acrylonitrile resinous copolymer made as described above in various ratios and molded into tests strips under a pressure of 1000 pounds per square inch and tested for hardness, softening point, notched and unnotched impact resistance, and Olsen stiffness. The results of these tests are set forth in Table II. All parts are by weight.

TABLE II

*Blends of Lactoprene EV polymer with styrene/acrylonitrile resinous copolymer*

| Examples | 6 | 7 | 8 | 9 | 10 |
|---|---|---|---|---|---|
| Parts of styrene/acrylonitrile copolymer | 90.0 | 80.0 | 70.0 | 60.0 | 50.0 |
| Parts of Lactoprene EV | 10.0 | 20.0 | 30.0 | 40.0 | 50.0 |
| Shore D Hardness | 83 | 80 | 78 | 69 | 65 |
| Softening Point, °F | 228 | 223 | 226 | 218 | 217 |
| Izod Notched Impact | .45 | 1.67 | 3.16 | 15.0 | 10.1 |
| Izod Unnotched Impact | 3.5 | [3] DNB | DNB | DNB | DNB |
| Olsen Stiffness, Pounds required to deflect a 1″ x 4″ x 0.075″ test strip 30° | 1.44 | 1.32 | .78 | .40 | .24 |

[3] See table II.

The ethyl acrylate polymer may be used in amounts of from 10 to 90 parts per 100 parts of combined styrene/acrylonitrile polymer and ethyl acrylate polymer. It is preferred to use 10 to 50 parts of the acrylate in order to make a stiffer stock than is obtained when using more than 50 parts of the acrylate.

Other polyacrylates were used in blends with the styrene/acrylonitrile resinous copolymer in the same manner employed for polyethylacrylate but desirable impact resistance was not obtained. The polyacrylates found unsatisfactory, regardless of the amount of either component used, included methyl methacrylate polymer, methyl acrylate polymer, octyl acrylate polymer and the n-butyl acrylate polymer. These polymers when blended with the styrene/acrylonitrile resinous copolymer failed to even appreciably improve the Izod impact resistance possessed by the styrene/acrylonitrile resinous copolymer as shown by the control. Therefore it was surprising to find a significant improvement when an ethyl acrylate polymer was added to the styrene/acrylonitrile resinous copolymer.

The impact resistant blends of this invention are useful in the manufacture of football helmets, football shoulder pads, golf ball covers, luggage and numerous other applications where resistance to scuff and fracture by impact is required.

While certain representative embodiments and details have been shown for the purpose of illustrating the invention, it will be apparent to those skilled in this art that various changes and modifications may be made therein without departing from the spirit or scope of the invention.

What is claimed is:

1. A thermoplastic impact-resistant composition comprising a blend of 10 to 90 parts of a rubbery ethyl acrylate polymer resulting from the polymerization of a mixture containing at least 95% by weight of ethyl acrylate and up to 5% by weight of 2-chloroethyl vinyl ether, and 90 to 10 parts of a copolymer resulting from the polymerization of a mixture containing 50 to 85% by weight of styrene and from 50 to 15% by weight of acrylonitrile, said parts being by weight based on the sum of the weights of the acrylate polymer and the styrene/acrylonitrile copolymer.

2. The composition of claim 1 in which the rubbery component is the homopolymer of ethyl acrylate.

3. The composition of claim 1 in which the acrylate polymer is the reaction product of 95 parts of ethyl acrylate and 5 parts of 2-chloroethyl vinyl ether.

4. The composition of claim 1 in which the styrene/acrylonitrile copolymer is made by reacting a mixture comprising 75 parts of styrene and 25 parts of acrylonitrile.

5. The composition of claim 1 in which are present 70 parts of the acrylate polymer and 30 parts of the styrene/acrylonitrile copolymer.

References Cited in the file of this patent

UNITED STATES PATENTS 2,646,417    Jennings _____ July 21, 1953

FOREIGN PATENTS 691,493    Great Britain _____ May 13, 1953